(12) United States Patent
Suzuki et al.

(10) Patent No.: US 10,302,747 B2
(45) Date of Patent: May 28, 2019

(54) DISTANCE MEASURING APPARATUS, ELECTRONIC DEVICE, METHOD FOR MEASURING DISTANCE, AND RECORDING MEDIUM

(71) Applicants: Shuichi Suzuki, Kanagawa (JP); Mitsuru Nakajima, Kanagawa (JP); Hideomi Fujimoto, Kanagawa (JP)

(72) Inventors: Shuichi Suzuki, Kanagawa (JP); Mitsuru Nakajima, Kanagawa (JP); Hideomi Fujimoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 433 days.

(21) Appl. No.: 15/191,015

(22) Filed: Jun. 23, 2016

(65) Prior Publication Data

US 2016/0299219 A1    Oct. 13, 2016

Related U.S. Application Data

(63) Continuation of application No. PCT/JP2014/082304, filed on Dec. 5, 2014.

(30) Foreign Application Priority Data

Dec. 27, 2013   (JP) .................. 2013-270931

(51) Int. Cl.
*G01S 7/48* (2006.01)
*G01S 7/486* (2006.01)
(Continued)

(52) U.S. Cl.
CPC .......... *G01S 7/4865* (2013.01); *G01S 7/4817* (2013.01); *G01S 7/4868* (2013.01); *G01S 17/10* (2013.01); *G01S 17/42* (2013.01); *G01S 7/497* (2013.01)

(58) Field of Classification Search
CPC . G01S 17/00; G01S 17/10; G01S 7/48; G01S 7/486; G01S 7/497; G01S 13/00; G01S 13/22
See application file for complete search history.

(56) References Cited

U.S. PATENT DOCUMENTS 6,516,286 B1   2/2003   Aebischer et al.
7,623,222 B2   11/2009  Benz et al.
(Continued)

FOREIGN PATENT DOCUMENTS

EP    1 043 603 A1    10/2000
JP    S49-091263      8/1974
(Continued)

OTHER PUBLICATIONS

Extended European Search Report dated Nov. 23, 2016 in European Patent Application No. 14873466.8.
(Continued)

*Primary Examiner* — Luke D Ratcliffe
(74) *Attorney, Agent, or Firm* — Oblon, McClelland, Maier & Neustadt, L.L.P.

(57) ABSTRACT

A distance measuring apparatus measuring a distance to an object is disclosed. The apparatus includes a light projector projecting an irradiating light onto the object; a first receiver receiving and converting a reflected light into a received light signal; a second receiver adjacent to the light projecting unit, the second receiver receiving and converting the irradiating light into a reference signal, the second receiver being different from the first receiver; and a distance measuring unit measuring the distance based on a time. The distance measuring unit calculates an integrated waveform based on a reference waveform of the reference signal and a waveform of the received light signal, determines, based on the integrated waveform, a time from projection of the irradiating light onto the object by the light projecting unit (Continued)

until reception of the reflected light by the first receiver, and calculates the distance based on the determined time.

15 Claims, 15 Drawing Sheets

(51) Int. Cl.
 *G01S 17/10* (2006.01)
 *G01S 17/42* (2006.01)
 *G01S 7/481* (2006.01)
 *G01S 7/497* (2006.01)

(56) References Cited

U.S. PATENT DOCUMENTS

| | | | |
|---|---|---|---|
| 7,630,062 B2 | 12/2009 | Mori et al. | |
| 8,330,095 B2* | 12/2012 | Kawabata | G01S 7/4812 250/221 |
| 8,773,644 B2 | 7/2014 | Suzuki et al. | |
| 9,020,750 B2 | 4/2015 | Nakajima et al. | |
| 9,188,674 B2 | 11/2015 | Suzuki et al. | |
| 9,261,301 B2 | 2/2016 | Foy | |
| 2002/0018198 A1 | 2/2002 | Pierenkemper | |
| 2004/0085526 A1* | 5/2004 | Gogolla | G01S 7/4861 356/4.01 |
| 2011/0235018 A1* | 9/2011 | Mori | G01C 3/08 356/5.01 |
| 2013/0120734 A1 | 5/2013 | Ogata et al. | |
| 2013/0229645 A1 | 9/2013 | Suzuki et al. | |
| 2014/0003062 A1 | 1/2014 | Yoshimura et al. | |
| 2014/0034817 A1 | 2/2014 | Nakamura et al. | |
| 2014/0071428 A1 | 3/2014 | Suzuki et al. | |
| 2015/0029487 A1 | 1/2015 | Nakajima et al. | |

FOREIGN PATENT DOCUMENTS

| | | |
|---|---|---|
| JP | H05-062882 U | 8/1993 |
| JP | H06-207977 | 7/1994 |
| JP | H07-234282 | 9/1995 |
| JP | 2000-304862 | 11/2000 |
| JP | 2002-372578 | 12/2002 |
| JP | 2004-157044 | 6/2004 |
| JP | 2007-071595 | 3/2007 |
| JP | 2008-070270 | 3/2008 |
| JP | 2008-524563 | 7/2008 |
| JP | 2012-063236 | 3/2012 |
| JP | 2014-055860 | 3/2014 |
| JP | 2014-174069 | 9/2014 |

OTHER PUBLICATIONS

International Search Report dated Mar. 3, 2015 in PCT/JP2014/082304 filed on Dec. 5, 2014 (with English translation).
Written Opinion dated Mar. 3, 2015 in PCT/JP2014/082304 filed on Dec. 5, 2014.

* cited by examiner

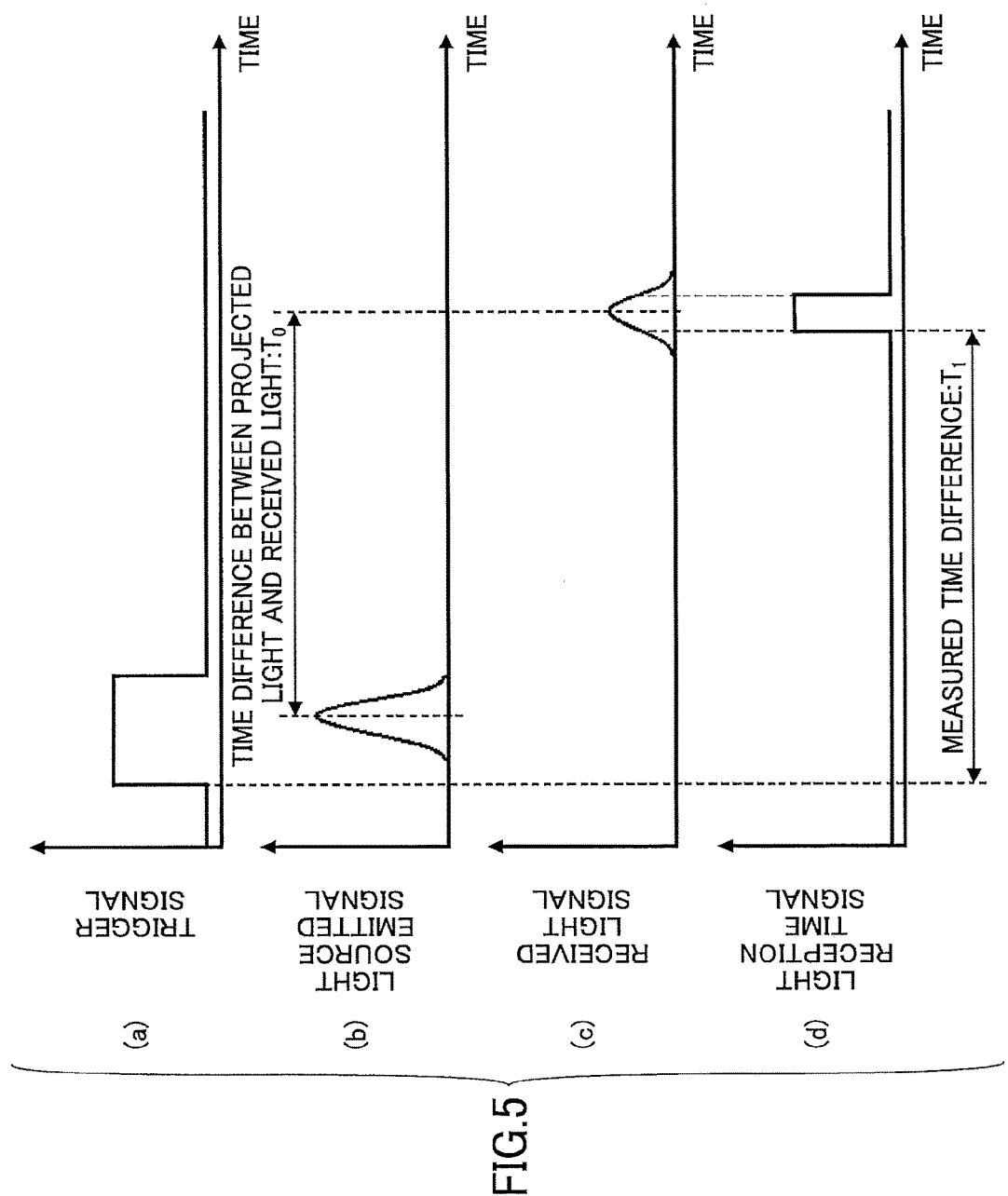

DISTANCE MEASURING APPARATUS, ELECTRONIC DEVICE, METHOD FOR MEASURING DISTANCE, AND RECORDING MEDIUM

CROSS-REFERENCE TO RELATED APPLICATIONS

The present application is a continuation application of International Application No. PCT/JP2014/082304 filed Dec. 5, 2014, which claims priority to Japanese Patent Application No. 2013-270931 filed Dec. 27, 2013. The contents of these applications are incorporated herein by reference in their entirety.

BACKGROUND OF THE INVENTION

1. Field of the Invention

The present disclosure relates to a distance measuring apparatus, an electronic device including the distance measuring apparatus, a method for measuring distance, and a computer-readable recording medium storing a computer-readable distance measuring program.

2. Description of the Related Art

In safety devices for vehicles, ships, railways, and the like and the field of Factory Automation (FA), there are distance measuring devices that use Time Of Flight (TOF), by which a distance to a distance measurement object is measured based on a time difference between when an irradiating light is projected onto the distance measurement object and when a reflected light arrives.

The distance measuring devices that use the TOF include a light source that projects an irradiating light onto the distance measurement object and a light reception unit, in which the light reception unit has a light receiving element such as a photo diode that receives a reflected light reflected from the distance measurement object and converts the reflected light into a voltage signal, and an optical part such as a lens that introduces the reflected light into the light receiving element.

However, in typical distance measuring devices that use the TOF, the strength of received light signals obtained by receiving and converting a reflected light into electric signals is not constant.

FIG. 1 is a schematic graph depicting a relationship between difference of signal strength of reflected lights and a comparator threshold in the distance measuring device that uses the TOF. In FIG. 1, the ordinate indicates the strength of received light signals in an arbitrary unit and the abscissa indicates time in an arbitrary unit. As illustrated in FIG. 1, among the received light signals in the distance measuring device, the strength of received light signals s1 from a highly reflective object such as reflector disposed in a close location becomes very high due to the highly reflective object and may exceed a detection limit of the light receiving element. In this case, the received light signals s1 detected by the light receiving element exceed a saturation level ss of received signals and is saturated.

In contrast, received light signals s2 from a distance measurement object present at a distant place or received light signals s3 from a distance measurement object formed with a material having low reflectance are very small in comparison with the received light signals s1 from the highly reflective object disposed in a close location. In this case, if a threshold sth of a comparator that converts the received light signals s1 to s3 into temporal signals is set as a fixed value, times t1, t2, and t3 to reach the threshold sth depend on the strength of the received light signals.

As illustrated in FIG. 1, as the strength of the received light signals s1 to s3 becomes lower, a time when the strength of the received light signals s1 to s3 exceeds the threshold sth is delayed further. A pulse width of laser light emitted by a distance measuring device that uses typical pulsed light in the TOF is about several tens of ns, for example.

Accordingly, depending on the strength of the received light signals s1 to s3, even if reflected lights arrive at the light receiving element at the same time, an arrival time of the reflected lights may have an error of 10 ns or more. This error corresponds to a measurement error of 1.5 m or more when converted into distance.

One method for improving measurement accuracy in the distance measuring device is to cause the signal strength to approximate a certain value by feeding a value of the strength of received light signals back to a gain control of an amplifier, for example.

Further, another method for improving the measurement accuracy in the distance measuring device is to measure a peak value of received light signals using a peak hold circuit or the like and to perform time correction depending on a peak value.

However, in the method by which the value of the signal strength is fed back to the gain control of the amplifier, signal strength is not always correspondent.

Further, in the method by which the time correction is performed depending on the peak value, a waveform of the received light signals may be changed depending on a fluctuation in an operating environment or the like.

Further, in the distance measuring device, a received light signal amplifier provides a shot noise component or a circuit noise component upon signal amplification. Accordingly, an electrical noise component at a certain level or more is inevitably generated.

FIG. 2 is a schematic graph illustrating a relationship between received light signals and a comparator threshold if noise is included in reflected lights in the distance measuring device that uses the TOF. In FIG. 2, the ordinate indicates the strength of received light signals s0 in an arbitrary unit, the abscissa indicates time in an arbitrary unit, and broken lines sn indicate a noise level. Further, in FIG. 2, a part of the received light signals s0 in a field surrounded by a circle is enlarged below. As illustrated in FIG. 2, in general, the threshold sth of a comparator is set to have a strength that is about several times the amount of a noise level sn where no reflected lights are input. However, random noise components are added to an original light pulse waveform in the received light signals s0 of a received reflected light.

Accordingly, in a typical distance measuring device, if time detection is performed with a certain threshold sth, a detection time difference Δt may be generated at random due to noise components. An influence of noise will notably appear in particular if the strength of the received light signals s0 is low.

As described above, in a method for measuring distance that uses the typical TOF and the distance measuring device that performs the method for measuring distance, the signal strength of reflected lights is fluctuated and noise is added to received light signals by the amplifier.

In addition, as a distance measuring device for measuring a distance with a high degree of accuracy, there is a proposed device including an integration processing unit that integrates outputs of an amplifier circuit and a distance correction unit that corrects a distance based on an output of the integration processing unit (see Patent Document 1, for example).

Further, as another example of a distance measuring device for measuring a distance with a high degree of accuracy, because a correlation between irradiating signals and received light signals is maximized when a waveform of the irradiating signals corresponds to a waveform of the received light signals, there is a proposed device that calculates a distance to an object based on this correlation (see Patent Document 2, for example).

However, in the technique proposed in Patent Document 1, detection timing depends on the signal strength of reflected lights because the detection timing upon arrival is calculated focusing mainly on rising characteristics of the reflected lights.

Further, in the technique proposed in Patent Document 1, an influence of noise included in received light signals increases because a differential waveform of a signal waveform is used as a method for detecting a rising time of reflected lights.

Further, in the technique proposed in Patent Document 2, if noise components are included in received light signals by the amplifier as described above, the waveform of the irradiating signals does not correspond to the waveform of the received light signals.

RELATED ART DOCUMENTS

[Patent Document 1] Japanese Unexamined Patent Application Publication No. 2008-070270
[Patent Document 2] Japanese Unexamined Patent Application Publication No. 2004-157044

SUMMARY OF THE INVENTION

According to one aspect of the present invention, there is provided a distance measuring apparatus measuring a distance to a distance measurement object based on a time from projection of an irradiating light onto the distance measurement object until reception of a reflected light from the distance measurement object. The distance measuring apparatus includes a light projecting unit configured to project the irradiating light onto the distance measurement object; a first light receiving unit configured to receive the reflected light and convert the reflected light into a received light signal based on the reflected light; a second light receiving unit disposed adjacent to the light projecting unit, the second light receiving unit being configured to receive the irradiating light and convert the irradiating light into a reference signal based on the irradiating light, the second light receiving unit being different from the first light receiving unit; and a distance measuring unit configured to measure the distance to the distance measurement object based on a time from projection of the irradiating light onto the distance measurement object by the light projecting unit until reception of the reflected light by the first light receiving unit. The distance measuring unit calculates an integrated waveform based on a reference waveform of the reference signal and a waveform of the received light signal, determines, based on the integrated waveform, the time from the projection of the irradiating light onto the distance measurement object by the light projecting unit until the reception of the reflected light by the first light receiving unit, and calculates the distance to the distance measurement object based on the determined time.

BRIEF DESCRIPTION OF THE DRAWINGS

Other objects and further features of embodiments will become apparent from the following detailed description when read in conjunction with the accompanying drawings, in which:

FIG. 5 is a schematic graph illustrating the principle of distance measurement by the distance measuring apparatus;

DESCRIPTION OF THE EMBODIMENTS

In the following, embodiments of a distance measuring apparatus, an electronic device, a method for measuring distance, and a computer-readable recording medium storing a distance measuring program in the present invention are described with reference to drawings.

It is an object of at least one embodiment of the present invention to provide a distance measuring apparatus capable of measuring a distance with a high degree of accuracy.

<Distance Measuring Apparatus (1)>

First, a distance measuring apparatus according to an embodiment of the present invention is described.

Figure 1:
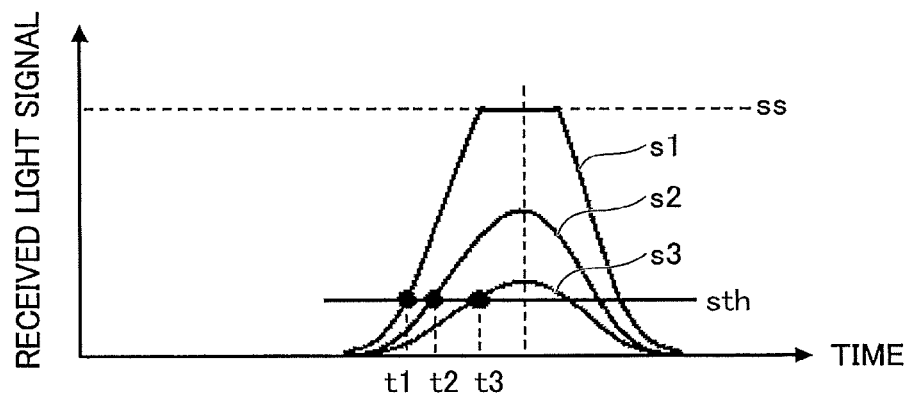
FIG. 1 is a schematic graph illustrating a relationship between difference of signal strength of reflected lights and a comparator threshold in a distance measuring device that uses TOF.
Figure 2:
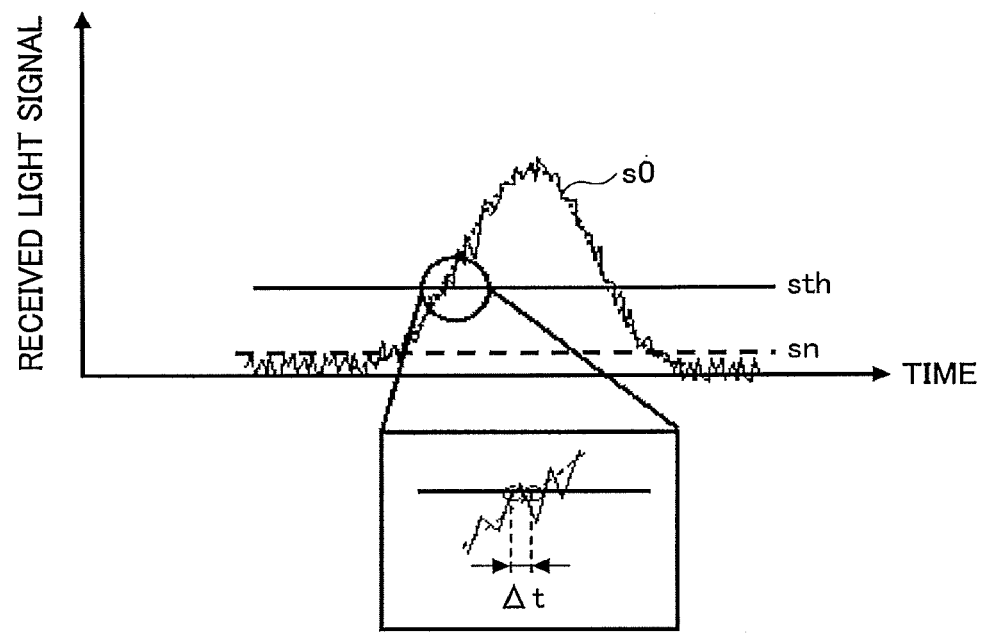
FIG. 2 is a schematic graph illustrating a relationship between a received light signal and a comparator threshold if noise is included in reflected light in a distance measuring device that uses TOF.
Figure 3:
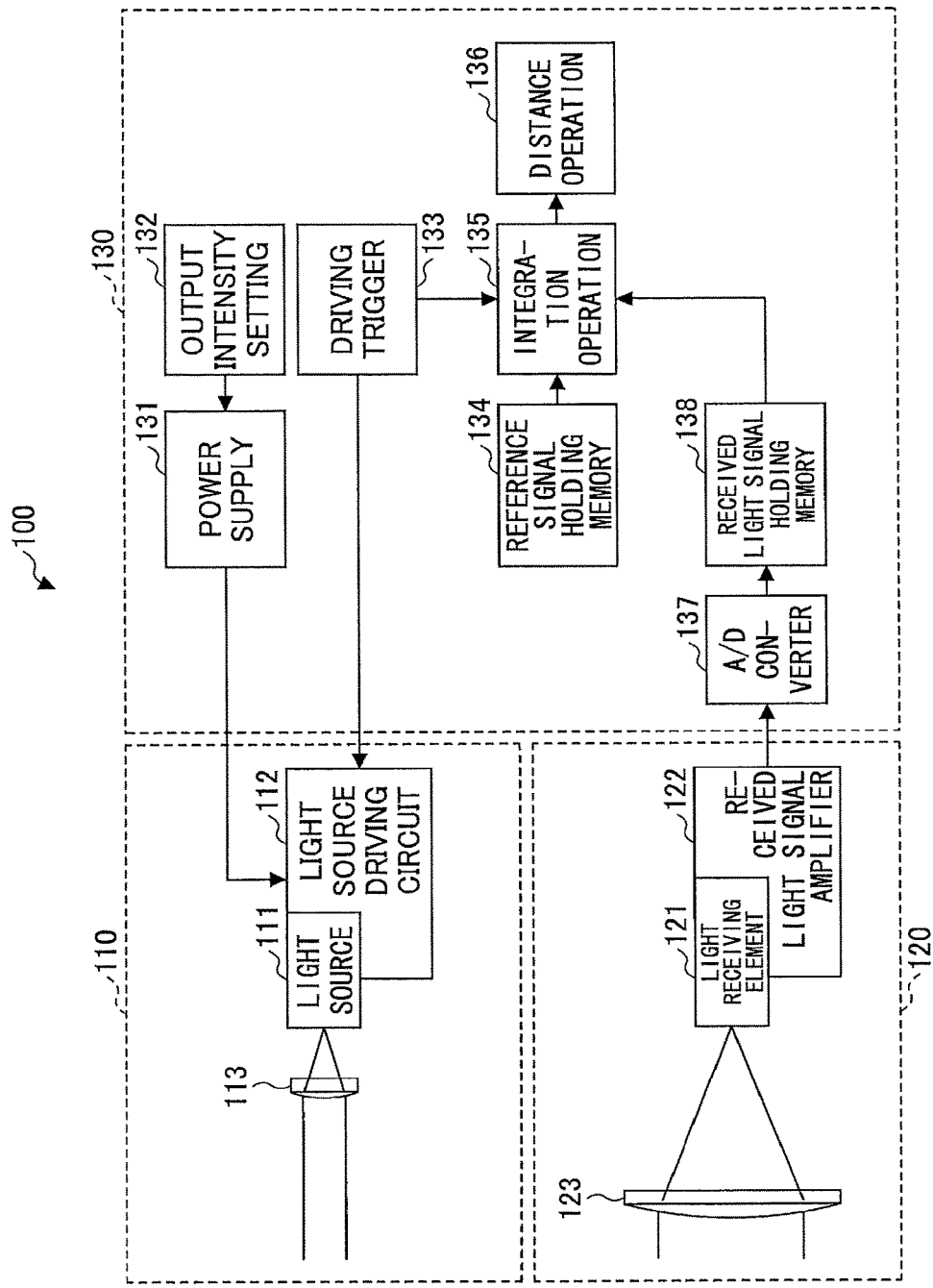
FIG. 3 is a block diagram depicting a distance measuring apparatus according to an embodiment of the present invention.

FIG. 3 is a block diagram depicting the distance measuring apparatus according to an embodiment of the present invention. As illustrated in FIG. 3, a distance measuring apparatus 100 according to the embodiment includes a light projecting unit 110, a light receiving unit 120, and a distance measuring unit 130. The distance measuring apparatus 100 performs a method for measuring distance according to an embodiment of the present invention.

The distance measuring apparatus 100 according to the embodiment can be implemented when a distance measuring program according to the embodiment of the present invention is executed by an information processing device such as a processor, a general-purpose computer, or an in-car computer. The distance measuring program may be stored in a computer-readable recording medium according to an embodiment of the present invention. The computer-readable recording medium may be formed with a non-transitory recording medium such as a magnetic recording medium, a magneto-optical recording medium, an optical recording medium, and a semiconductor storage device.

In the distance measuring apparatus 100, the light projecting unit 110 and the light receiving unit 120 are disposed adjacent to each other and their optical axes are arranged to have an approximately coaxial relationship.

The light projecting unit 110 includes a light source 111, a light source driving circuit 112, and a light projection lens 113.

The light source 111 can project irradiating lights for laser distance measurement and may be formed with a semiconductor laser diode that emits an infrared light, for example.

The light source driving circuit 112 controls driving of the light source 111 such that irradiating lights are continuously projected as modulated lights (pulsed lights) having pulsed light emission waveforms.

The light projection lens 113 transmits the irradiating lights projected from the light source 111. The irradiating lights that have been transmitted become a light beam having a predetermined spread angle and the light beam is irradiated onto a distance measurement object (not illustrated).

The light receiving unit 120 includes a light receiving element 121, a received light signal amplifier 122, and a light receiving lens 123.

The light receiving element 121 may be formed with a photo diode that receives light reflected (hereafter also referred to as "reflected light") on the distance measurement object among the irradiating lights and converts the light into an electric signal (hereafter also referred to as "received light signal").

The received light signal amplifier 122 amplifies received light signals converted by the light receiving element 121.

The light receiving lens 123 introduces reflected lights that have arrived at the distance measuring apparatus 100 into the light receiving element 121. While reflected lights are scattered in a uniform direction at a reflection point, only those light components that return to the distance measuring apparatus 100 through the same optical path as that for the irradiating lights projected from the distance measuring apparatus 100 are introduced into the light receiving element 121 via the light receiving lens 123.

The distance measuring unit 130 includes a power supply unit 131, an output intensity setting unit 132, a driving trigger unit 133, a reference signal holding memory 134, an integration operation unit 135, a distance operation unit 136, an analog/digital (A/D: Analog-to-Digital) conversion unit 137, and a received light signal holding memory 138.

The power supply unit 131 outputs a DC voltage for driving the light source 111. Because the strength of a current signal for driving the light source 111 is controlled in accordance with the DC voltage, the emission intensity of the light source 111 is controlled in accordance with the DC voltage provided by the power supply unit 131.

The output intensity setting unit 132 is a circuit that controls the output intensity of the DC voltage of the power supply unit 131.

The driving trigger unit 133 outputs a trigger signal as a digital signal for controlling the light source driving circuit 112 at predetermined time intervals. In other words, when the DC voltage output by the power supply unit 131 and the trigger signal output by the driving trigger unit 133 are input to the light source driving circuit 112, the light source driving circuit 112 outputs a current signal having a predetermined pulse width and a pulse waveform to the light source 111 so as to control driving of the light source 111.

In addition, in a typical distance measuring device that uses a laser beam, the pulse width of the laser beam ranges from several nanoseconds (ns) through several tens of ns and light emission peak intensity ranges from several W through 100 W, for example.

The reference signal holding memory 134 stores a waveform of a reference signal (or a reference waveform). The reference signal here refers to a signal related to projection of irradiating lights, such as a signal modeled on a signal of the irradiating light, or a received light signal of the irradiating light that is projected from the light source 111 and is not reflected from a distance measurement object. The reference signal is used for integration operation with the received light signal of a reflected light described below.

The integration operation unit 135 generates an integrated waveform f(t) in response to an input of a trigger signal from the driving trigger unit 133 and obtains a peak value (or a maximum value) of the integrated waveform. The integration operation unit 135 generates the integrated waveform f(t) from operation in Formula (1) below based on waveform data r(t) on the reference signal from the reference signal holding memory 134 and waveform data s(t) on the received light signal from the received light signal holding memory 138.

[Formula 1]

$$f(t) = \int_0^T s(\tau) \cdot r(\tau - t) d\tau \qquad \text{Formula (1)}$$

In Formula (1) above, T represents an integration interval of the reference signal and the received light signal. Here, the T may be set to a sufficiently large value in comparison with a time difference between the received light signal and the reference signal. In general, because a laser pulse is emitted periodically, the T may be a value of a pulsed emission interval or less.

Further, the T is preferably small in consideration of an operation load for the integration operation unit 135, so that the T may be set to a suitable value depending on a distance to be measured and the amplitude of a laser pulse. For example, in a case of a distance measuring apparatus whose distance measurement range is 60 m at the maximum, a time difference between the reference signal and the received light signal is 400 ns at the maximum and pulse amplitude of an emitted laser is about 30 ns. In this case, it is preferable to set T = 500 ns, for example.

In addition, a calculation load in the operation process in Formula (1) above will be significantly reduced if fast Fourier transformation is used, for example.

The A/D conversion unit 137 converts received light signals from analog signals into digital signals, the received light signals being output from the received light signal amplifier 122.

The received light signal holding memory 138 stores received light signals converted into the digital signals by the A/D conversion unit 137. The received light signal holding memory 138 temporarily stores received light signals each time the received light signal is output from the A/D conversion unit 137.

Figure 4A:
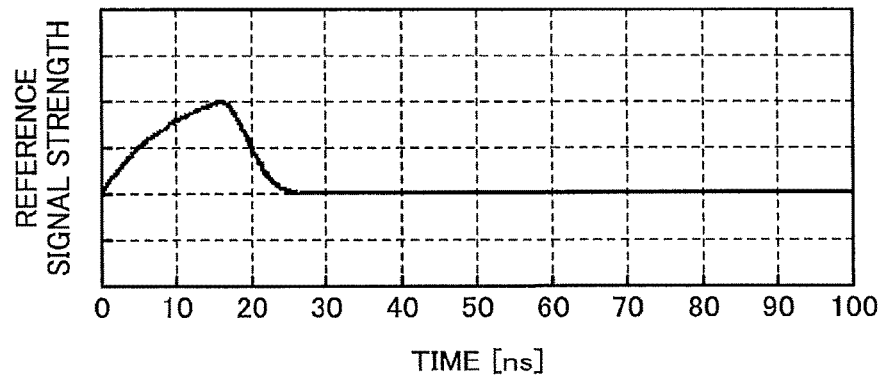
FIG. 4A is a schematic graph illustrating a reference signal waveform in the distance measuring apparatus of FIG. 3.
Figure 4B:
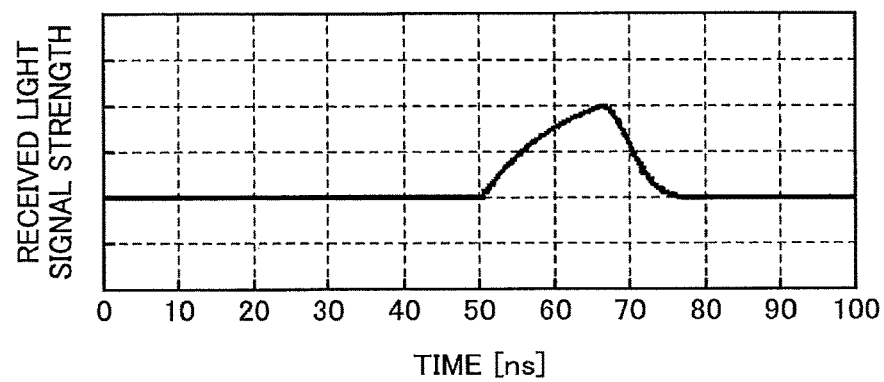
FIG. 4B is a schematic graph illustrating a received light signal waveform in the distance measuring apparatus of FIG. 3.
Figure 4C:
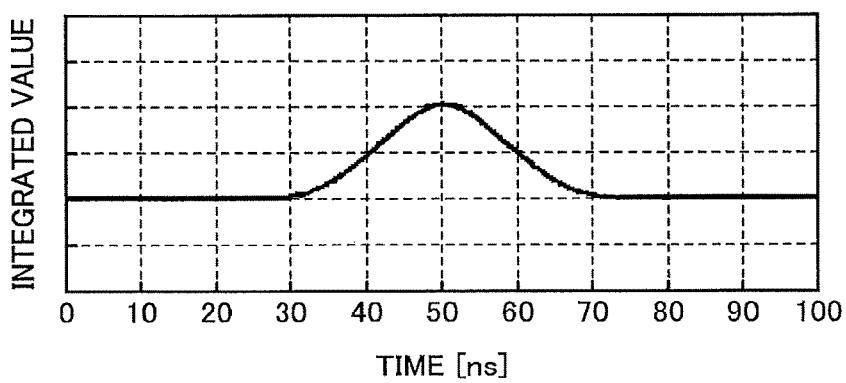
FIG. 4C is a schematic graph illustrating an integrated waveform in the distance measuring apparatus of FIG. 3.

FIG. 4A is a schematic graph illustrating a reference signal waveform in the distance measuring apparatus of FIG. 3. FIG. 4B is a schematic graph illustrating a received light signal waveform in the distance measuring apparatus of FIG. 3. FIG. 4C is a schematic graph illustrating an integrated waveform in the distance measuring apparatus of FIG. 3. And the abscissa indicates time.

The waveform of the reference signal depicted in FIG. 4A is equal to an emission profile of an irradiating light projected from the light source 111 and is set such that a pulse waveform rises at 0 seconds of time. Further, the pulse width of the waveform of the reference signal is assumed to be 15 ns.

The waveform of the received light signal depicted in FIG. 4B is assumed to rise 50 ns later following the reference signal.

In the following, the waveform of an irradiating light is described. In a method for measuring distance that uses the typical TOF, a time when the waveform of the received light signal reaches a threshold of a comparator is used as a pulse arrival time, so that the waveform desirably has a steep rising.

Although it is preferable to widen a frequency band of the light receiving element and the received light signal amplifier in order to convert the received light signal having a steep waveform into an electric signal with high reproducibility, as the band is wider, electric noise increases.

Accordingly, if it is important to detect a received light signal with low strength, it is desirable to limit a frequency band within which the light receiving unit 120 can receive light. Due to this fact, if it is important to detect a received light signal with low strength, it is inappropriate to use a waveform having a steep rising for the waveform of an irradiating light.

Further, in the method for measuring distance that uses the TOF, because an amount of current to be applied to the light source 111 reaches several tens of A at its peak, it may not be easy in general to control the waveform of an irradiating light in a detailed manner.

In contrast, even if the waveform of an irradiating light that has a long rising time as illustrated in FIG. 4A and FIG. 4B is used, the distance measuring apparatus 100 is capable of measuring a distance with a high degree of accuracy without being influenced by the waveform of the light source 111.

The integrated waveform depicted in FIG. 4C illustrates a result of calculation when the waveform of a reference signal and the waveform of a received light signal are substituted in Formula (1). As illustrated in FIG. 4C, the integrated waveform has a clear peak value (maximum value) at time=50 ns.

FIG. 5 is a schematic graph illustrating the principle of distance measurement by the distance measuring apparatus 100. FIG. 5-(a) depicts a trigger signal, FIG. 5-(b) depicts a signal of an irradiating light, FIG. 5-(c) depicts a received light signal, FIG. 5-(d) depicts a light reception time signal, and the abscissa indicates time.

As illustrated in FIG. 5, a measured time difference $T_1$ corresponds to a time from an output of the trigger signal until a peak value of the integrated waveform (namely, an output of the light reception time signal), the measured time difference $T_1$ being calculated in a process by the integration operation unit 135. Further, a time difference $T_0$ between a projected light and a received light corresponds to a time from projection of an irradiating light onto a distance measurement object by the light projecting unit 110 until reception of a reflected light by the light receiving unit 120.

The distance operation unit 136 obtains the $T_0$ from the $T_1$ and a known correction value ΔT measured in advance in a calibration step or the like.

The distance operation unit 136 calculates a distance L to the distance measurement object from the obtained $T_0$ and the velocity of light c in Formula (2) below.

[Formula 2]

$$L = \frac{c \cdot T_0}{2} = \frac{c \cdot (T_1 + \Delta T)}{2} \qquad \text{Formula (2)}$$

For the $T_1$, if sampling time intervals are reduced, for example, a time by which the integrated waveform is maximized can simply be employed. Further, for the $T_1$, if the sampling time intervals are prolonged, a value can be estimated using a method such as complementing waveform data or calculating a centroid position adjacent to a peak.

In the above description, the integrated waveform is calculated such that the reference signal and the received light signal are set to have the same strength. However, even if the strength of the received light signal is changed, a time by which the peak value of the integrated waveform is maximized does not change. Thus, according to the distance measuring apparatus 100, it is possible to calculate a distance to the distance measurement object with a high degree of accuracy.

Figure 6A:
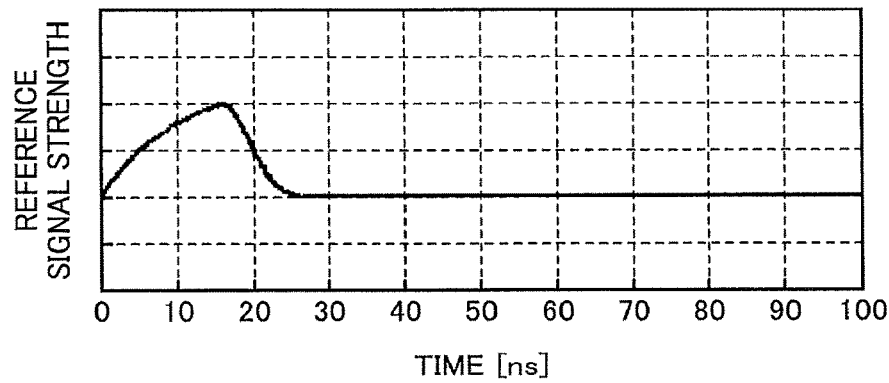
FIG. 6A is another schematic graph illustrating a reference signal waveform in the distance measuring apparatus of FIG. 3.
Figure 6B:
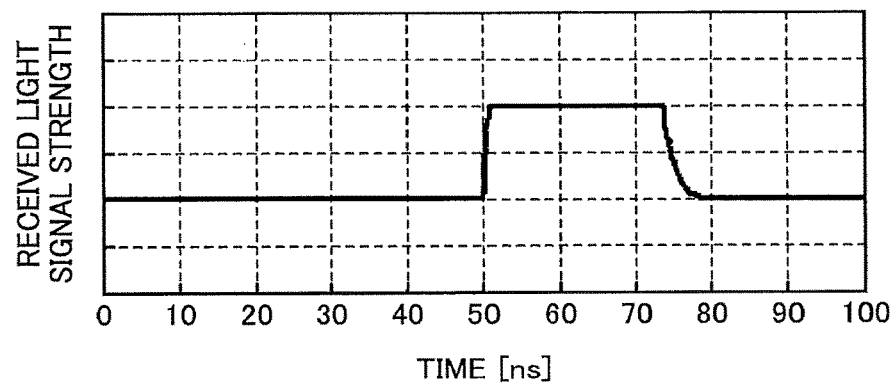
FIG. 6B is another schematic graph illustrating a received light signal waveform in the distance measuring apparatus of FIG. 3.
Figure 6C:
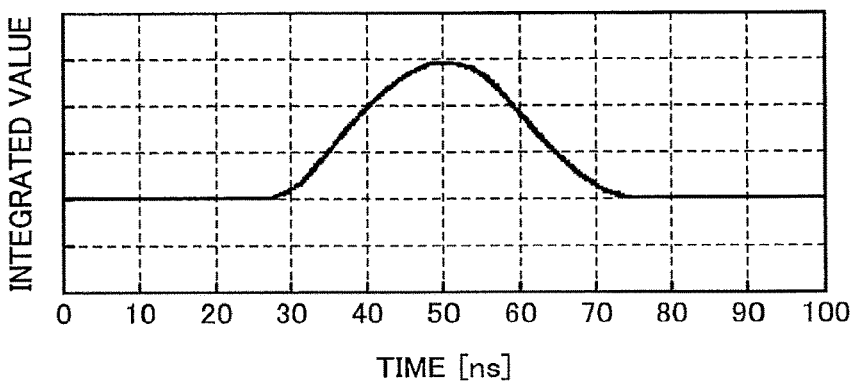
FIG. 6C is another schematic graph illustrating an integrated waveform in the distance measuring apparatus of FIG. 3.

FIG. 6A is another schematic graph illustrating a reference signal waveform in the distance measuring apparatus of FIG. 3. FIG. 6B is another schematic graph illustrating a received light signal waveform in the distance measuring apparatus of FIG. 3. In FIG. 6B, the intensity of a reflected light from a distance measurement object is extremely high in comparison with the strength of the reference signal and the received light becomes saturated. FIG. 6C is another schematic graph illustrating an integrated waveform in the distance measuring apparatus of FIG. 3. And the abscissa indicates time.

As illustrated in FIG. 6B, it is assumed that the peak intensity of the received light signal waveform is 10 times a saturation value.

Although the waveform of the reference signal is greatly different from the waveform of the received light signal, the integrated waveform calculated by the integration operation unit 135 using Formula (1) above has a peak value at a time $T_1=50$ ns as illustrated in FIG. 6C.

As described above, the distance measuring apparatus 100 according to the embodiment can measure a distance with a high degree of accuracy even if the strength of the received light signal is greatly changed.

<Distance Measuring Apparatus (2)>

In the following, a distance measuring apparatus according to another embodiment of the present invention is described with reference mainly to a difference from the distance measuring apparatus 100 according to the embodiment described above.

Figure 7:
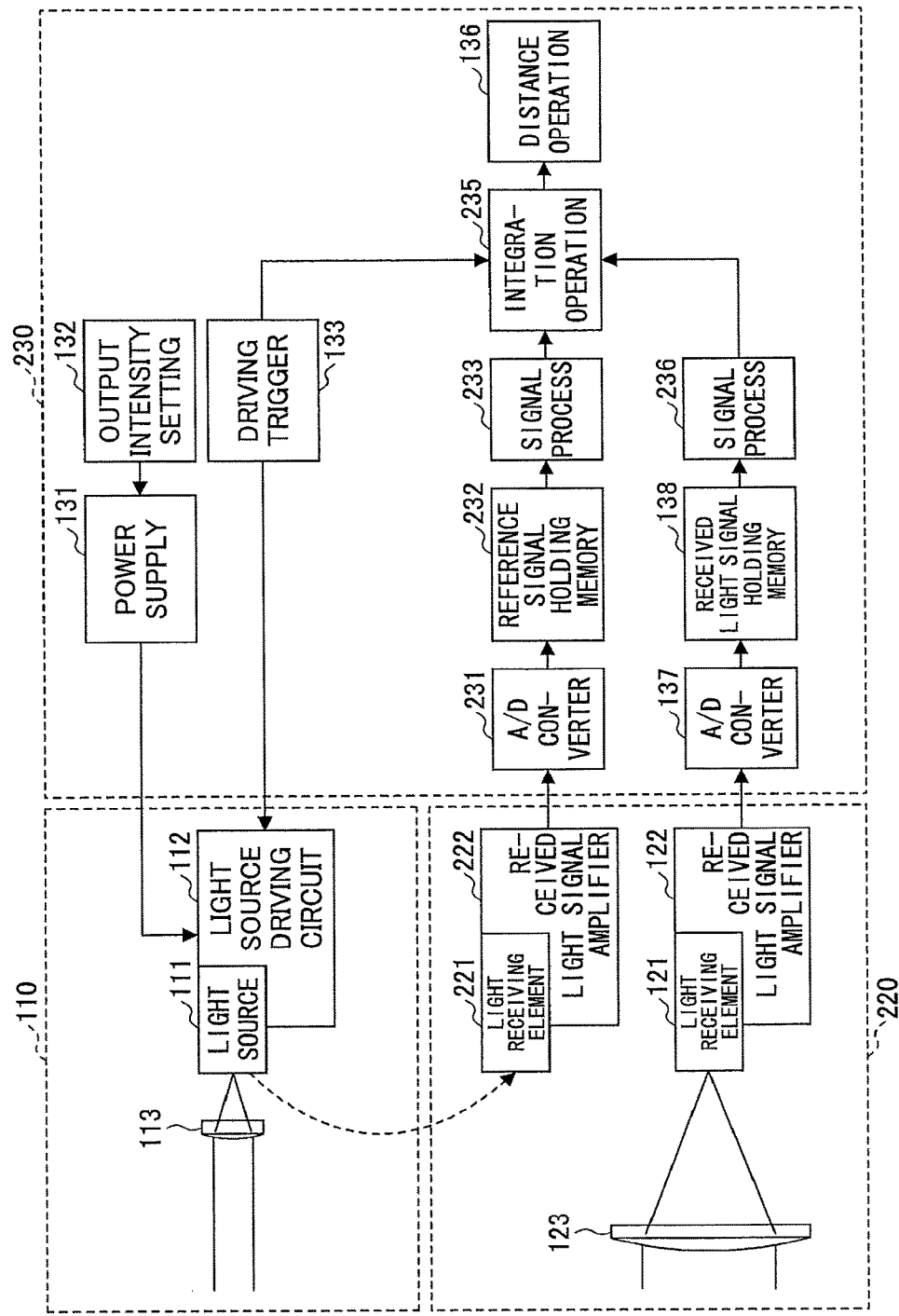
FIG. 7 is a block diagram depicting a distance measuring apparatus according to another embodiment of the present invention.

FIG. 7 is a block diagram depicting the distance measuring apparatus according to another embodiment of the present invention. As illustrated in FIG. 7, a distance measuring apparatus 200 is different from the distance measuring apparatus 100 in a configuration of a light receiving unit 220 and a configuration of a distance measuring unit 230

The light receiving unit 220 is different from the light receiving unit 120 described above in that the light receiving unit 220 includes a second light receiving unit having a light receiving element 221 and a received light signal amplifier 222. The second light receiving unit obtains an irradiating light as a reference signal, the irradiating light being projected from the light projecting unit 110.

The light receiving element 221 may be formed with a photo diode that converts light components of a part of irradiating lights into an electric signal, the irradiating lights being projected from the light source 111 and not being reflected from a distance measurement object.

The received light signal amplifier 222 amplifies a received light signal converted by the light receiving element 221. The amplified received light signal is output to the distance measuring unit 230 as a reference signal.

In general, the pulse peak intensity of a laser light source is as extremely high as several tens of W, so that if the second light receiving unit can receive a quantity of light of about 1 µW using the light receiving element 221, the second light receiving unit can generate a reference signal.

In other words, when the light receiving element 221 is disposed adjacent to the light source 111, the second light receiving unit can obtain light components diffused around the light source 111.

For the second light receiving unit, a part of light components from the light source 111 may be guided to the light receiving element 221 using an optical element (not illustrated) such as a lens, a mirror, or an optical fiber where necessary.

The distance measuring unit 230 is different from the distance measuring unit 130 described above in that the distance measuring unit 230 includes an A/D conversion unit 231, and signal processing units 233 and 236. Further, because the distance measuring unit 230 includes the A/D conversion unit 231 and the signal processing units 233 and 236, operations of a reference signal holding memory 232 and an integration operation unit 235 are different from the distance measuring unit 130 described above.

The A/D conversion unit 231 converts a reference signal from an analog signal into a digital signal, the reference signal being output from the received light signal amplifier 222.

The reference signal holding memory 232 stores the waveform of the reference signal converted by the A/D conversion unit 231.

As for the reference signal stored in the reference signal holding memory 232, the reference signal may be updated per pulsed emission of the light source 111 or an arbitrary time interval longer than a pulsed emission cycle may be set for updating in order to reduce a processing load of the distance measuring unit 230.

For the reference signal stored in the reference signal holding memory 232, it is possible to use a signal of a waveform obtained by averaging waveforms of a plurality of irradiating lights obtained by the light receiving element 221 as described below. By employing, as the reference signal, the waveform obtained by averaging the waveforms of the plurality of irradiating lights, the distance measuring apparatus 200 can reduce random noise that results from the reference signal.

The signal processing unit 233 performs an averaging process, a normalization process, or the like described below on the reference signal stored in the reference signal holding memory 232.

The signal processing unit 236 performs an averaging process, a normalization process, or the like described below on a received light signal stored in the received light signal holding memory 138.

The integration operation unit 235 generates an integrated waveform f(t) based on Formula (1) above in response to an input of a trigger signal from the driving trigger unit 133 and obtains a peak value of the integrated waveform.

As described above, the distance operation unit 136 obtains the $T_0$ from the $T_1$ and a known correction value $\Delta T$ measured in advance in a calibration step or the like and calculates the distance L to the distance measurement object from the obtained $T_0$ and the velocity of light c in Formula (2) above.

A process performed by the distance measuring apparatus 200 is described as an example based on small received light signals that contain many random noises.

Figure 8A:
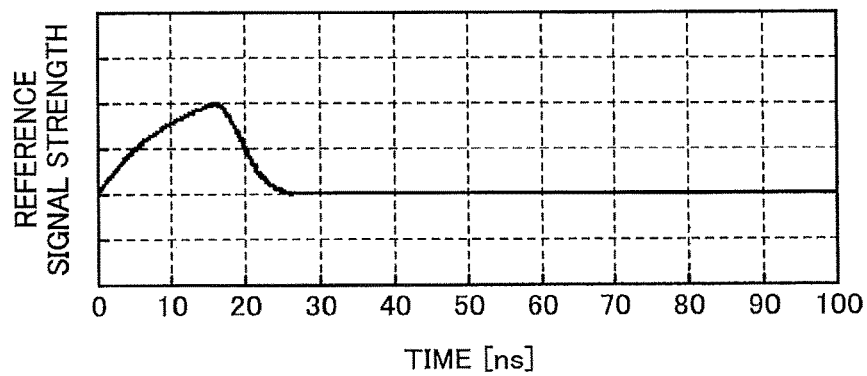
FIG. 8A is a schematic graph illustrating a reference signal waveform in the distance measuring apparatus of FIG. 7.
Figure 8B:
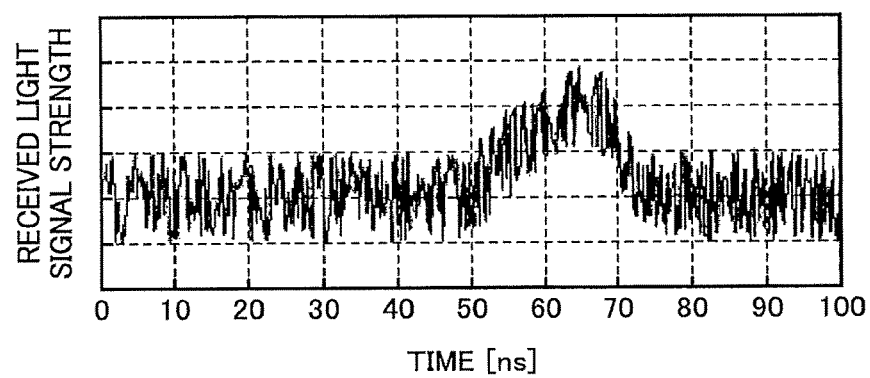
FIG. 8B is a schematic graph illustrating a received light signal waveform in the distance measuring apparatus of FIG. 7.
Figure 8C:
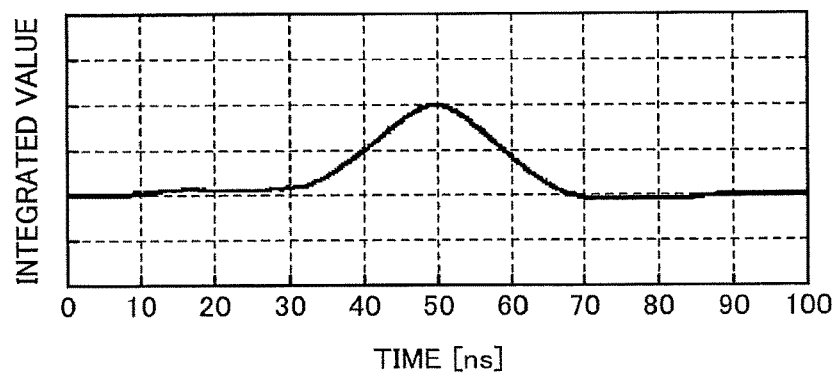
FIG. 8C is a schematic graph illustrating an integrated waveform in the distance measuring apparatus of FIG. 7.

FIG. 8A is a schematic graph illustrating a reference signal waveform in the distance measuring apparatus of FIG. 7. FIG. 8B is a schematic graph illustrating a received light signal waveform in the distance measuring apparatus of FIG. 7. FIG. 8C is a schematic graph illustrating an integrated waveform in the distance measuring apparatus of FIG. 7. And the abscissa indicates time. FIG. 8A illustrates the same waveform as the waveform of the reference signal described above.

The received light signal illustrated in FIG. 8B contains noise components that correspond to the strength of a peak value generated at random relative to the strength of signals. As for such a received light signal, if a signal arrival time is detected using a threshold of a comparator as in a typical distance measuring device, the signal arrival time may have a detection time error of about 10 ns due to an influence of random noise.

In contrast, from the integrated waveform calculated by the distance measuring apparatus 200, the integrated waveform being illustrated in FIG. 8C, it is possible to determine a peak time from a clear peak value in the calculated integrated waveform even if the integrated waveform is calculated based on the received light signal containing great random noise components as in FIG. 8B.

<Averaging Process Performed by Signal Processing Units>

In the following, an averaging process performed by the signal processing units 233 and 236 is described.

In the averaging process performed by the signal processing units 233 and 236, in order to reduce an influence of noise contained in a received light signal, the signal processing unit 233 generates a waveform (averaged waveform) of a second received light signal from waveforms of a plurality of received light signals, the waveform of the second received light signal being different from the waveforms of the plurality of received light signals. In this case, it is possible to calculate the averaged waveform in a method such as calculating a waveform from an average value of the waveforms of the plurality of received light signals or obtaining an addition value of the waveforms of the plurality of received light signals.

Figure 9A:
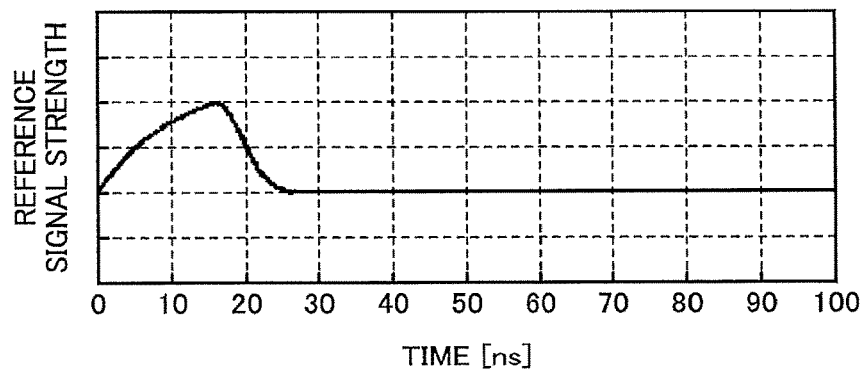
FIG. 9A is another schematic graph illustrating a reference signal waveform in the distance measuring apparatus of FIG. 7.
Figure 9B:
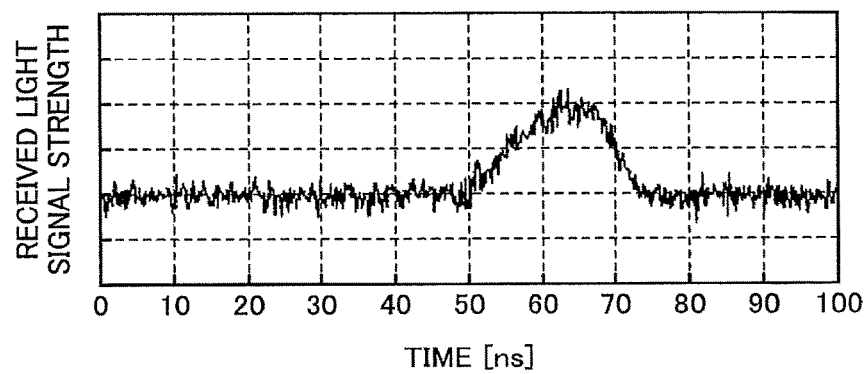
FIG. 9B is another schematic graph illustrating a received light signal waveform in the distance measuring apparatus of FIG. 7.
Figure 9C:
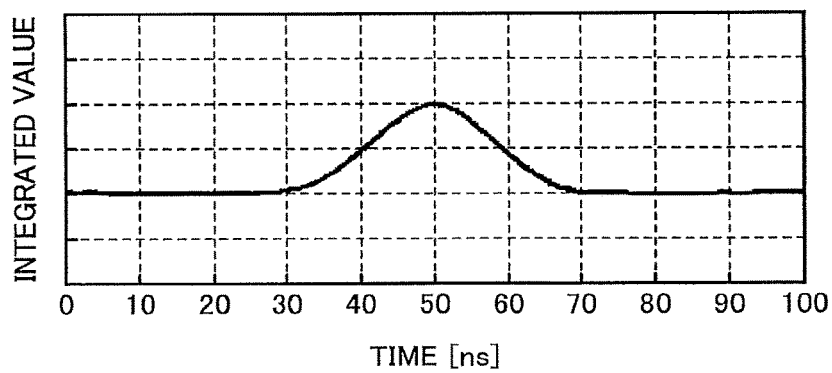
FIG. 9C is another schematic graph illustrating an integrated waveform in the distance measuring apparatus of FIG. 7.

FIG. 9A is another schematic graph illustrating a reference signal waveform in the distance measuring apparatus of FIG. 7. FIG. 9B is another schematic graph illustrating a received light signal waveform in the distance measuring apparatus of FIG. 7. FIG. 9C is another schematic graph illustrating an integrated waveform in the distance measuring apparatus of FIG. 7. And the abscissa indicates time. While FIG. 9A illustrates the same waveform as the waveform of the reference signal described above, the same waveform is based on an averaged waveform generated by the signal processing unit 233.

FIG. 9B illustrates an averaged waveform generated from obtaining received light signals ten times, the received light signals containing the above noise components. As illustrated in FIG. 9B, in the averaged waveform, a noise level is reduced in comparison with the received light signal containing noise components illustrated in FIG. 8B.

By using an averaged waveform for the waveform of a reference signal or the waveform of a received light signal, the distance measuring apparatus 200 can obtain an integrated waveform that has a very clear peak at a time corresponding to a signal time difference as illustrated in FIG. 9C.

<Normalization Process Performed by Signal Processing Units>

In the following, a normalization process performed by the signal processing units 233 and 236 is described.

In the normalization process performed by the signal processing units 233 and 236, a maximum value and a minimum value of a reference signal or a received light signal are normalized to a predetermined maximum value (1.0, for example) and a predetermined minimum value (0, for example), respectively. The integration operation unit 235 calculates an integrated waveform using a normalized reference signal or a normalized received light signal.

One reason for performing the normalization process here is to prevent a peak value from becoming relatively unclear due to an integrated value that becomes greater by an integration operation in a time period where no signals are present if offset components are loaded due to noise or the like in the time period where no signals are present. Further, another reason for performing the normalization process is to prevent an overflow of the received light signal holding memory 138.

The distance measuring apparatus 200 can approximate the waveform of a reference signal to the waveform of a received light signal in an approximately corresponding manner by using light components projected from the light source 111 as the reference signal by the second light receiving unit.

<Peak Time Estimation Process on Integrated Waveform>

In the following description, the distance measuring apparatus 200 performs a peak time estimation process on an integrated waveform, by which the peak time is estimated by complementing in a predetermined approximation formula based on values of reference signals and received light signals, the values being obtained discretely at predetermined sampling intervals (or acquisition intervals).

In general, in order to perform a distance measurement process with good accuracy, it is preferable to accurately detect a peak time of the integrated waveform described above. For example, if distance accuracy of 0.1 m or less is required, a detection error of the peak time is preferably 0.66 ns or less.

In order to measure a distance with such a high degree of accuracy, it is preferable to use an A/D conversion unit capable of high-speed processing and obtain data at short sampling intervals (high sampling rate), such that an integrated waveform is calculated.

In view of this, the distance measuring apparatus 200 performs a peak time estimation process in order to measure a distance with a high degree of accuracy even if the sampling rate is low.

Figure 10A:
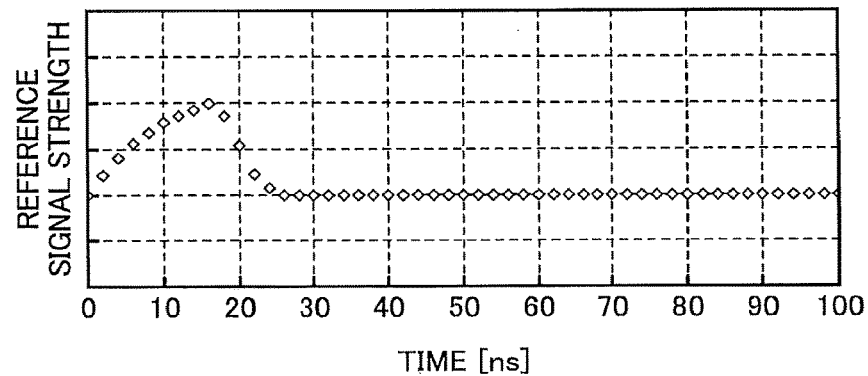
FIG. 10A is yet another schematic graph illustrating a reference signal waveform in the distance measuring apparatus of FIG. 7.
Figure 10B:
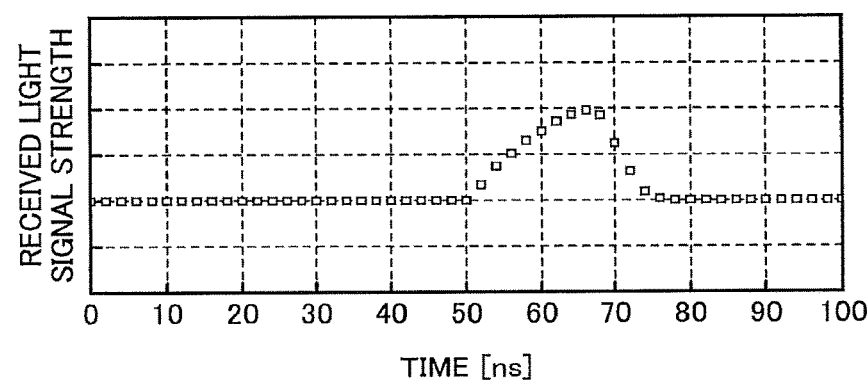
FIG. 10B is yet another schematic graph illustrating a received light signal waveform in the distance measuring apparatus of FIG. 7.
Figure 10C:
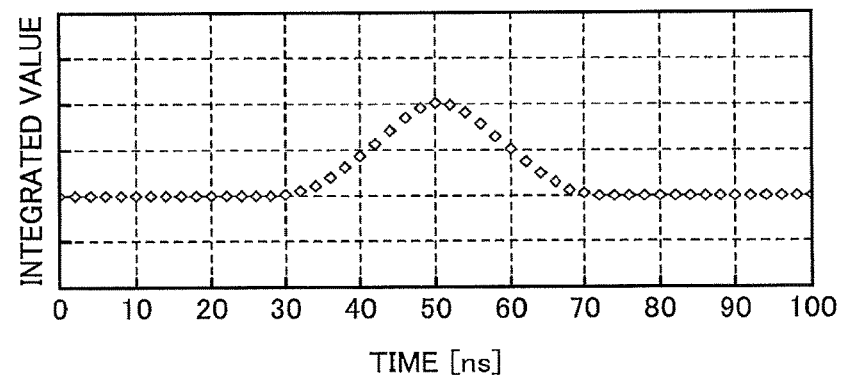
FIG. 10C is yet another schematic graph illustrating an integrated waveform in the distance measuring apparatus of FIG. 7.

FIG. 10A is yet another schematic graph illustrating a reference signal waveform in the distance measuring apparatus of FIG. 7. FIG. 10B is yet another schematic graph illustrating a received light signal waveform in the distance measuring apparatus of FIG. 7. FIG. 10C is yet another schematic graph illustrating an integrated waveform in the distance measuring apparatus of FIG. 7. And the abscissa indicates time.

Reference signals in FIG. 10A and received light signals in FIG. 10B are obtained discretely at sampling intervals of 2 ns.

Further, the integrated waveform in FIG. 10C indicates a result of obtaining the integrated waveform from the reference signals and the received light signals obtained discretely as described above. Integrated values are obtained at intervals of 2 ns in the same manner as in the sampling of the reference signals and the received light signals.

If a signal time difference T1 is calculated from a time that has a maximum value among numerical values simply discretized in an integrated waveform, a time measurement error of ±1 ns may be generated from the sampling intervals. This time measurement error corresponds to a measurement error of ±0.15 m when converted into distance.

In order to improve measurement accuracy using a discretized integrated waveform, complementing data on the discretized integrated waveform is effective. In this case, if the shape of the integrated waveform, especially a waveform adjacent to a peak, is known, it is possible to estimate a peak time by expressing the shape as a function expression and approximating discretized data with a given formula using a known method such as the least squares method.

In the embodiment, it is possible to estimate the peak time from data on a total of three points including one point of the peak time and two points adjacent to the one point in a more simplified manner.

Figure 11:
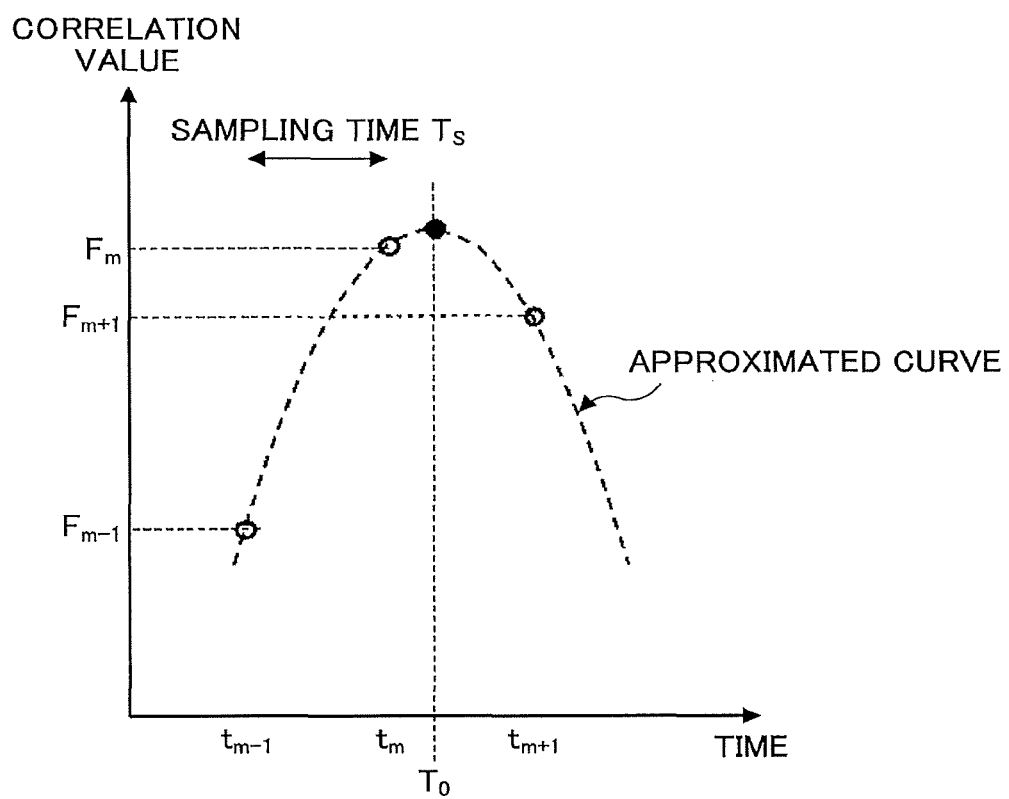
FIG. 11 is a schematic graph illustrating an idea of a peak value estimation process on an integrated waveform.

FIG. 11 is a schematic graph illustrating an idea of a peak value estimation process on an integrated waveform. In FIG. 11, the ordinate indicates a correlation value in an arbitrary unit and the abscissa indicates time in an arbitrary unit. As illustrated in FIG. 11, in a discretized integrated waveform, a maximum value of the integrated waveform obtained at intervals of a sampling time Ts is assumed to be Fm and a time when the integrated waveform has the maximum value is assumed to be tm.

Further, a value of the integrated waveform at a time tm−1 prior to the time tm by the time Ts is assumed to be Fm−1 and a value of the integrated waveform at a time tm+1 posterior to the time tm by the time Ts is assumed to be Fm+1.

A quadratic curve that passes through three points of the maximum value Fm and the prior and posterior values Fm−1 and Fm+1 is expressed by Formula (3) below.

[Formula 3]

$$g(t) = A(t - T_0)^2 + B \quad \text{Formula (3)}$$

If a quadratic curve that passes through the three points is obtained from Formula (3) above, the time T0 when Formula (2) above is maximized is obtained from Formula (4) below.

[Formula 4]

$$T_0 = t_m + \frac{F_{m+1} - F_{m-1}}{2(2F_m - F_{m-1} - F_{m+1})} T_s \quad \text{Formula (4)}$$

Figure 12:
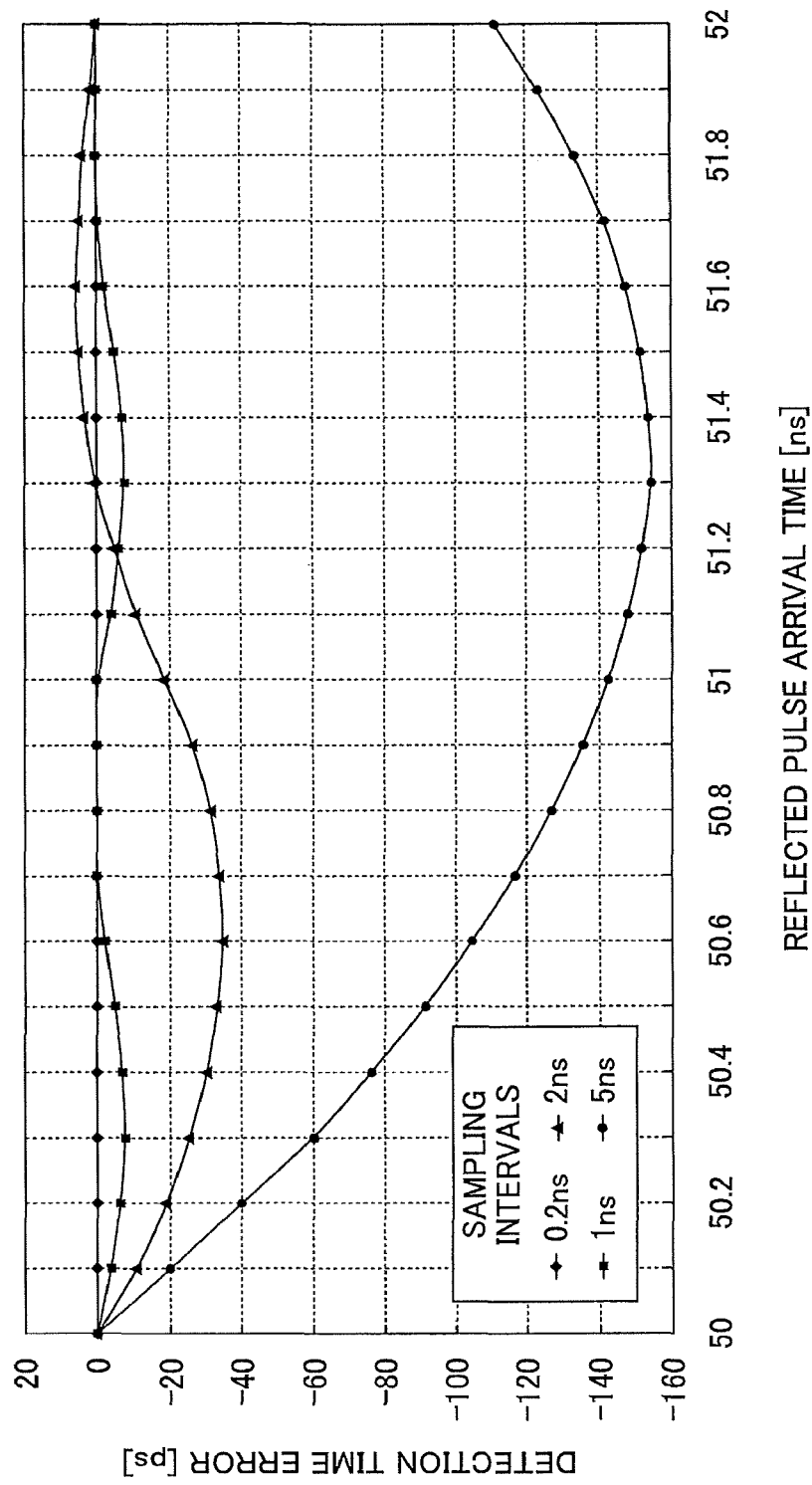
FIG. 12 is a schematic graph illustrating measurement accuracy in the peak value estimation process on an integrated waveform.

FIG. 12 is a schematic graph illustrating measurement accuracy in the peak value estimation process on an integrated waveform. In FIG. 12, the ordinate indicates a detection time error and the abscissa indicates a reflected pulse arrival time. In FIG. 12, measurement accuracy of time difference between a reference signal and a received light signal is calculated from the above peak time estimation process.

In FIG. 12, a rising time of received light signal strength is set in the abscissa and the rising time is varied by 0.1 ns from 50 ns. Further, in FIG. 12, a time difference with the rising time when the peak value of an integrated waveform is estimated using Formula (4) from the obtained integrated waveform is set as a detection time error in the ordinate.

Then, in FIG. 12, a relationship between sampling intervals and measurement accuracy is obtained while the sampling intervals are changed as parameters from 0.2 ns, 1 ns, 2 ns, through 5 ns.

As illustrated in FIG. 12, if the sampling intervals are 2 ns or less, for example, a detection time error is 40 ps or less at most. Accordingly, it is possible to measure a distance with a high degree of accuracy by which an error is 6 mm or less when converted into measurement distance.

Further, even if the sampling intervals are 5 ns, a detection time error is 200 ps or less. Accordingly, it is possible to measure a distance with distance accuracy of 30 mm or less when converted into measurement distance. This distance accuracy is sufficient when used in an electronic device such as an in-car radar device.

In accordance with the above result, in the peak value estimation process on an integrated waveform, it is confirmed that the sampling intervals are desirably 1 ns or more to 5 ns or less.

As described above, according to the distance measuring apparatus 200, it is possible to measure a distance with a high degree of accuracy even if received light signals contain noise components or received light signals are small because it is possible to easily determine a peak time of an integrated waveform by an averaging process.

Further, according to the distance measuring apparatus 200, it is possible to measure a distance with a high degree of accuracy because it is possible to easily determine a peak time of an integrated waveform using data on three points among discretized values and sampling intervals.

Further, according to the distance measuring apparatus 200, even if a waveform of an irradiating light is changed due to a change of a surrounding environment of the distance measuring apparatus 200, a secular change of the light source 111, or the like, a reference signal is updated in accordance with the change by a normalization process. Accordingly, it is possible to measure a distance with a high degree of accuracy.

<Distance Measuring Apparatus (3)>

In the following, a distance measuring apparatus according to yet another embodiment of the present invention is described with reference mainly to a difference from the distance measuring apparatus 200 according to the embodiment described above.

Figure 13:
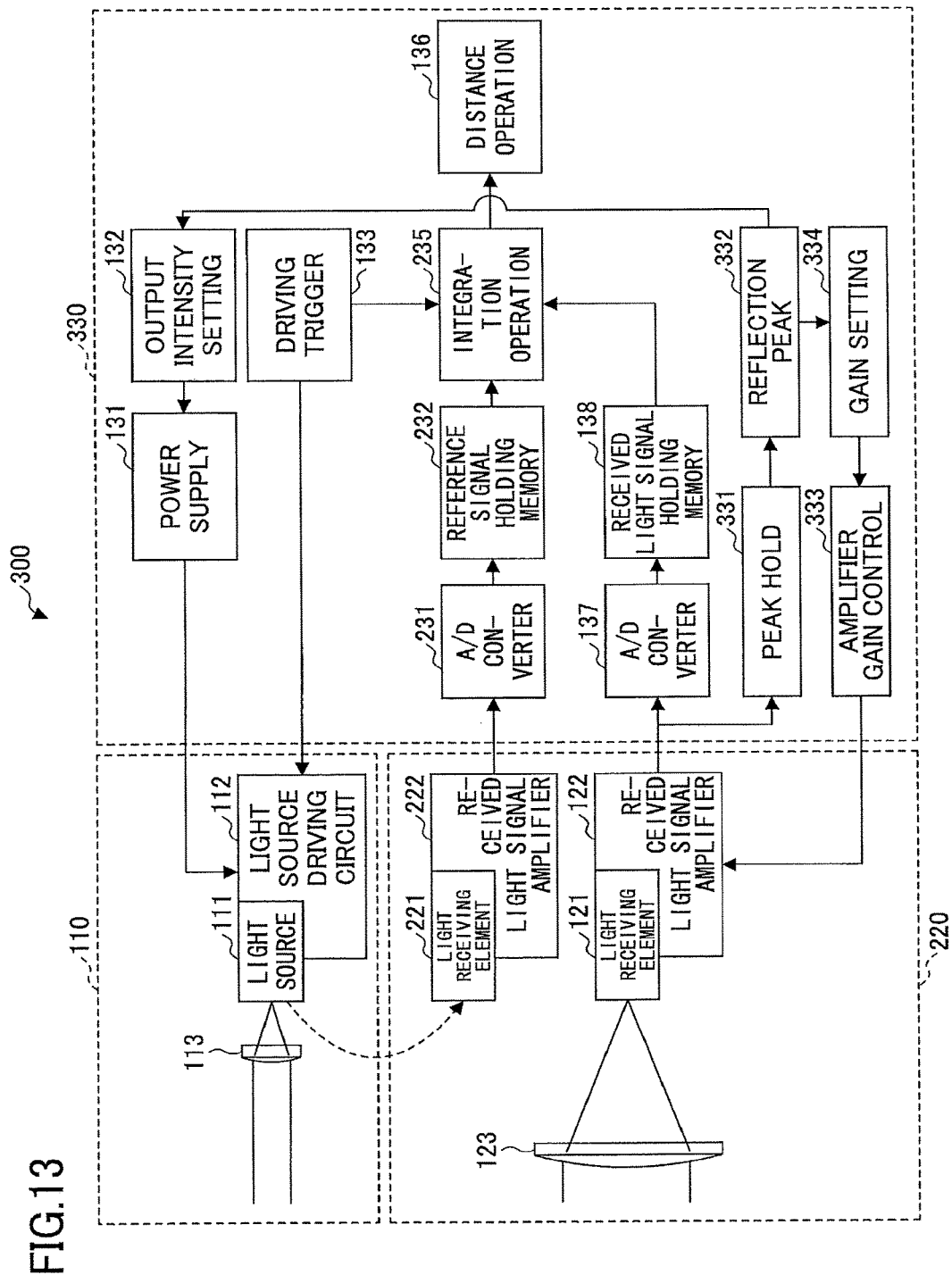
FIG. 13 is a block diagram depicting a distance measuring apparatus according to yet another embodiment of the present invention.

FIG. 13 is a block diagram depicting a distance measuring apparatus according to yet another embodiment of the present invention. As illustrated in FIG. 13, a distance measuring apparatus 300 according to the embodiment is different from the above distance measuring apparatus 200 in that a distance measuring unit 330 includes a peak hold unit 331, a feedback unit 332, an amplifier gain control unit 333, and a gain setting unit 334.

The peak hold unit 331 holds a maximum value of a received light signal as a signal for adjustment output from the received light signal amplifier 122.

The feedback unit 332 feeds back the strength of the received light signal as a signal for adjustment held by the peak hold unit 331 to the output intensity setting unit 132 and the gain setting unit 334. When the strength of the received light signal is fed back from the feedback unit 332, the gain setting unit 334 sets gain of the received light signal amplifier 122 in the amplifier gain control unit 333.

The amplifier gain control unit 333 controls the received light signal amplifier 122 based on the set gain of the received light signal amplifier 122.

Further, when the strength of the received light signal is fed back from the feedback unit 332, the output intensity setting unit 132 controls the output intensity of the power supply unit 131 based on the strength of the received light signal.

The power supply unit 131 outputs a DC voltage for driving the light source 111 based on output intensity feedback-controlled by the output intensity setting unit 132.

Figure 14:
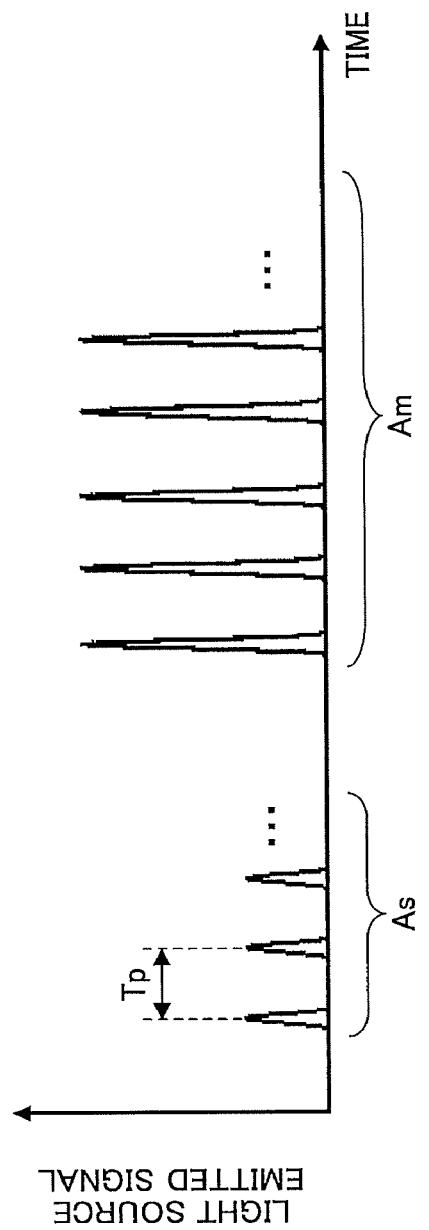
FIG. 14 is a schematic graph depicting a signal for adjustment and a signal for distance measurement in the distance measuring apparatus of FIG. 13.

FIG. 14 is a schematic graph depicting a signal for adjustment and a signal for distance measurement in the distance measuring apparatus 300 of FIG. 13. In FIG. 14, the ordinate indicates a light source emitted signal in an arbitrary unit and the abscissa indicates time in an arbitrary unit. As illustrated in FIG. 14, the distance measuring apparatus 300 performs a pre-emission of the light source 111 to output a signal for adjustment As before actually projecting an irradiating light to measure a distance to a distance measurement object. In FIG. 14, Tp indicates a pulsed emission interval and Am indicates a signal for distance measurement.

The feedback unit 332 feeds back a measurement result of reflected signal intensity in the pre-emission, the measurement result being held by the peak hold unit 331, to the output intensity setting unit 132 and the gain setting unit 334 such that the emission intensity of the light source 111 and an amplifier gain of the received light signal amplifier 122 are adjusted when a distance is measured.

By adding the feedback processing, the distance measuring apparatus 300 can obtain an approximately constant waveform of a received light signal even if a distance to a distance measurement object or reflectance of the distance measurement object changes variously.

In particular, if an object present very closely to the distance measuring apparatus 300 or an object having extremely high reflectance is a distance measurement object, by adding the feedback processing, it is possible to measure a distance with a high degree of accuracy using an integrated waveform by reducing saturation of received light signals.

Further, the distance measuring apparatus 300 can measure a distance with a higher degree of accuracy by performing the averaging process or the normalization process described above in addition to the feedback processing.

<Distance Measuring Apparatus (4)>

In the following, a distance measuring apparatus according to yet another embodiment of the present invention is described with reference mainly to a difference from the distance measuring apparatus according to the embodiment described above.

The distance measuring apparatus according to the embodiment divides a detection field by dividing light receiving surfaces of the light receiving elements 121 and 221 and measures a distance to a distance measurement object for each field. The light receiving surfaces of the light receiving elements 121 and 221 here are arranged orthogonal to a direction in which an irradiating light is projected and in a direction corresponding to or different from a direction (scanning direction) in which scanning is performed using the irradiating light.

By dividing the light receiving surfaces of the light receiving elements 121 and 221 into a plurality of parts and arranging the parts in the direction corresponding to the scanning direction, according to the distance measuring apparatus of the embodiment, it is possible to determine a location of the distance measurement object in the scanning direction with the plurality of light receiving surfaces and calculate a distance to the distance measurement object at the same time.

Further, by dividing the light receiving surfaces of the light receiving elements 121 and 221 into a plurality of parts and arranging the parts in the direction different from the scanning direction, according to the distance measuring apparatus of the embodiment, it is possible to determine the location of the distance measurement object in an arrangement direction with the plurality of light receiving surfaces and calculate a distance to the distance measurement object at the same time.

<Distance Measuring Apparatus (5)>

In the following, a distance measuring apparatus according to yet another embodiment of the present invention is described with reference mainly to a difference from the distance measuring apparatus according to the embodiment described above.

In the distance measuring apparatus according to the embodiment, an optical scanner (not illustrated) is disposed as a laser beam scanning unit on a projection direction side relative to the light projection lens 113, for example, the laser beam scanning unit performing scanning using the irradiating light in the horizontal direction. A polygon mirror, a galvanometer mirror, or the like may be used for the optical scanner.

By performing scanning using the irradiating light with the optical scanner, according to the distance measuring apparatus of the embodiment, it is possible to measure a distance with a high degree of accuracy in a wide field in the horizontal direction.

<Distance Measuring Apparatus (6)>

In the following, a distance measuring apparatus according to yet another embodiment of the present invention is described with reference mainly to a difference from the distance measuring apparatus according to the embodiment described above.

The distance measuring apparatus according to the embodiment oscillates the light projection lens 113 using a driving unit such as a piezoelectric motor in place of the optical scanner and performs scanning using the irradiating light by mutually changing a light emission axis of the light source 111 and an optical axis of the light projection lens 113.

By performing scanning using the irradiating light while changing a field to be irradiated, according to the distance measuring apparatus of the embodiment, it is possible to measure a distance with a high degree of accuracy in a wide detection field.

<Electronic Device>

In the following, an electronic device according to an embodiment of the present invention is described.

The electronic device according to the embodiment may be a safety device for vehicles, ships, railways, and the like or an object detection device in the field of Factory Automation (FA), the electronic device including a distance measuring device that measures a distance to a distance measurement object.

In this case, the distance measuring device included in the electronic device may be the distance measuring apparatus according to any one of the embodiments described above.

As described above, according to the electronic device of the embodiment, because the distance measuring apparatus according to any one of the embodiments is included, it is possible to measure a distance with a high degree of accuracy even if the strength of received light signals changes greatly.

<Method for Measuring Distance>

In the following, a method for measuring distance performed by the distance measuring apparatus according to any one of the embodiments described above is described with reference to a process of the distance measuring apparatus 300.

Figure 15:
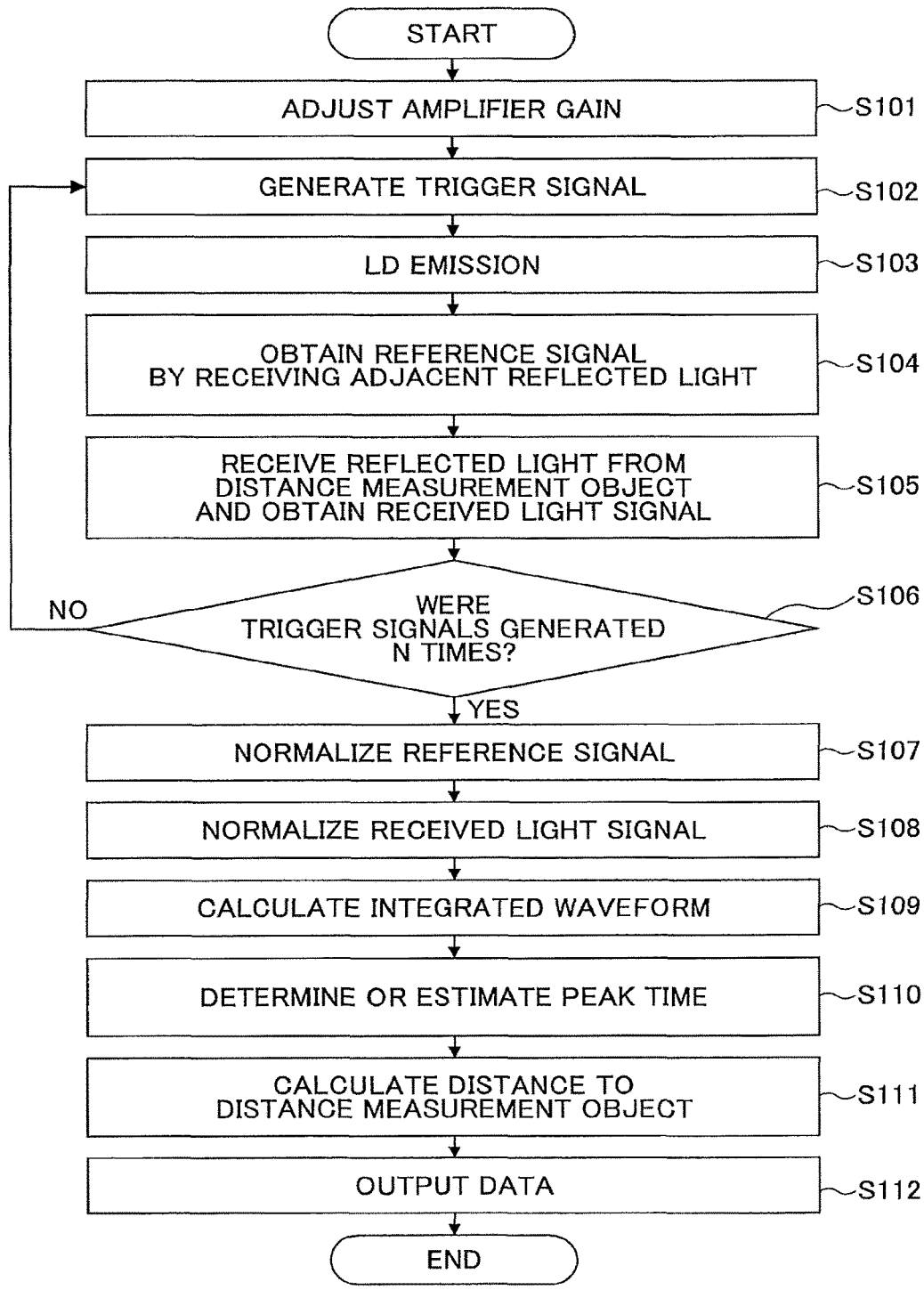
FIG. 15 is a flowchart illustrating a method for measuring distance performed by the distance measuring apparatus of FIG. 13.

FIG. 15 is a flowchart illustrating the method for measuring distance performed by the distance measuring apparatus 300 of FIG. 13. The flowchart depicted in FIG. 15 indicates the method for measuring distance according to an embodiment of the present invention, the method for measuring distance being performed by the distance measuring apparatus 300.

First, the distance measuring apparatus 300 adjusts the gain of the received light signal amplifier 122 and the emission intensity of the light source ill by performing pre-emission of the light source 111 to output a signal for adjustment (S101).

Then, the distance measuring apparatus 300 generates a trigger signal in the driving trigger unit 133 (S102).

Then, the distance measuring apparatus 300 drives the light source driving circuit 112 in accordance with timing of the trigger signal and emits a laser pulse light for distance measurement from the light source 111 (S103).

Then, the light receiving element 221 receives a reflected light adjacent to the light source 111 to receive a signal to be used as a reference signal. The distance measuring apparatus 300 stores the signal of the received light as the reference signal in the reference signal holding memory 232 via the received light signal amplifier 222 and the A/D conversion unit 231 (S104).

Then, the light receiving element 121 receives a reflected light as a received light signal from a distance measurement object. The distance measuring apparatus 300 stores the received light signal in the received light signal holding memory 138 via the A/D conversion unit 137 (S105).

In addition, if a signal processing unit (not illustrated) generates an averaged waveform by averaging a plurality of received light signals, the distance measuring apparatus 300 determines whether trigger signals are transmitted a number of times (N times) for the averaging (S106). If the trigger signals are not transmitted N times (S106: No), the distance measuring apparatus 300 repeats the process from S102.

If the trigger signals are transmitted N times (S106: Yes), the distance measuring apparatus 300 performs a normalization process on the reference signal using the signal processing unit (S107). Further, the distance measuring apparatus 300 performs a normalization process on the received light signal using the signal processing unit (S108).

Then, the distance measuring apparatus 300 calculates an integrated waveform using Formula (1) above based on the reference signal and the received light signal using the integration operation unit 235 (S109).

Then, the distance measuring apparatus 300 determines or estimates a peak time from the integrated waveform using the distance operation unit 136 (S110).

Then, the distance measuring apparatus 300 converts the peak time into a distance based on Formula (2) above to obtain a distance L to the distance measurement object (S111), and outputs a distance measurement result including the distance L (S112).

The distance measuring apparatus 300 can continuously measure a distance to an object that may be present in front of the distance measuring apparatus 300 with a high degree of accuracy by repeating the process at a predetermined frame rate, the above process in the method for measuring distance being handled as one cycle.

Figure 16:
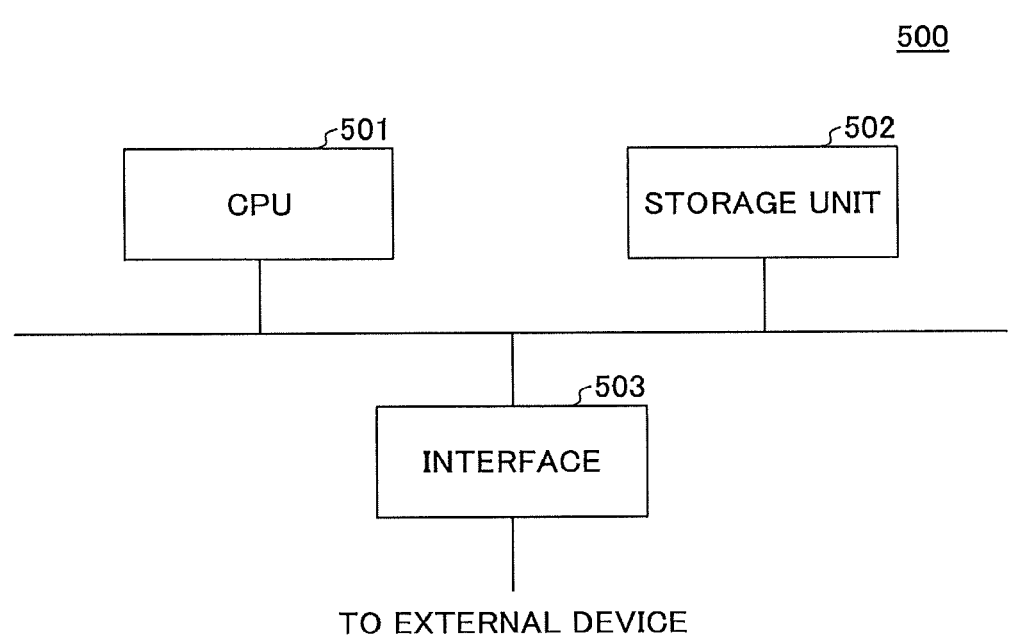
FIG. 16 is a block diagram depicting a computer system.

FIG. 16 is a block diagram depicting a computer system. A computer system 500 illustrated in FIG. 16 includes a Central Processing Unit (CPU) 501 as an example of a computer or a processor, a storage unit 502, and an interface 503. The CPU 501, the storage unit 502, and the interface 503 are coupled to one another via a coupling unit such as a bus. The CPU 501 controls the whole part of the computer system 500, the storage unit 502 stores a program such as a distance measuring program to be executed by the CPU 501, parameters to be used in the program, and various types of data including data on an intermediate result such as a calculation process performed by the program and data on a distance measurement result. The storage unit 502 may form a non-transitory computer-readable recording medium. The computer system 500 may be coupled to an external device such as the light projecting unit 110 or the light receiving unit 120 via the interface 503.

According to the present invention, it is possible to measure a distance with a high degree or accuracy.

Further, the present invention is not limited to these embodiments, and various variations and modifications may be made without departing from the scope of the present invention.

What is claimed is:

1. A distance measuring apparatus measuring a distance to a distance measurement object based on a time from projection of an irradiating light onto the distance measurement object until reception of a reflected light from the distance measurement object, the distance measuring apparatus comprising:

a light projecting unit configured to project the irradiating light onto the distance measurement object;

a first light receiving unit configured to receive the reflected light and convert the reflected light into a received light signal based on the reflected light;

a second light receiving unit disposed adjacent to the light projecting unit, the second light receiving unit being configured to receive the irradiating light and convert the irradiating light into a reference signal based on the irradiating light, the second light receiving unit being different from the first light receiving unit; and a distance measuring unit configured to measure the distance to the distance measurement object based on a time from projection of the irradiating light onto the distance measurement object by the light projecting unit until reception of the reflected light by the first light receiving unit, wherein the distance measuring unit calculates an integrated waveform based on a reference waveform of the reference signal and a waveform of the received light signal, determines, based on the integrated waveform, the time from the projection of the irradiating light onto the distance measurement object by the light projecting unit until the reception of the reflected light by the first light receiving unit, and calculates the distance to the distance measurement object based on the determined time, and wherein the integrated waveform is calculated from Formula (1)

$$f(t) = \int_0^T s(\tau) \cdot r(\tau - t) d\tau \qquad \text{Formula (1)}$$

where s(t) represents the received light signal, r(t) represents a signal of the reference waveform, and T represents an integration interval of the signal of the reference waveform and a signal of the reflected light.

2. A distance measuring apparatus measuring a distance to a distance measurement object based on a time from projection of an irradiating light onto the distance measurement object until reception of a reflected light from the distance measurement object, the distance measuring apparatus comprising:

a light projecting unit configured to project the irradiating light onto the distance measurement object;

a first light receiving unit configured to receive the reflected light and convert the reflected light into a received light signal based on the reflected light;

a second light receiving unit disposed adjacent to the light projecting unit, the second light receiving unit being configured to receive the irradiating light and convert the irradiating light into a reference signal based on the irradiating light, the second light receiving unit being different from the first light receiving unit; and a distance measuring unit configured to measure the distance to the distance measurement object based on a time from projection of the irradiating light onto the distance measurement object by the light projecting unit until reception of the reflected light by the first light receiving unit, wherein the distance measuring unit calculates an integrated waveform based on a reference waveform of the reference signal and a waveform of the received light signal, determines, based on the integrated waveform, the time from the projection of the irradiating light onto the distance measurement object by the light projecting unit until the reception of the reflected light by the first light receiving unit, and calculates the distance to the distance measurement object based on the determined time, and wherein the distance measuring unit discretely obtains the reference waveform and the waveform of the received light signal at acquisition intervals, calculates the integrated waveform in a discretized manner from the reference waveform and the waveform of the received light signal, both of which are discretely obtained, and complements, using an approximation formula, the discretized integrated waveform such that the distance to the distance measurement object is calculated.

3. The distance measuring apparatus according to claim 2, wherein the approximation formula is given by a quadratic curve that passes through a maximum value and values of given two points on the integrated waveform, the given two points being different from the maximum value.

4. The distance measuring apparatus according to claim 2, wherein the acquisition intervals are one nanosecond or more to five nanoseconds or less.

5. The distance measuring apparatus according to claim 2, wherein the reference waveform is a waveform obtained by averaging a plurality of reference signals converted from irradiating lights, the irradiating lights being received a predetermined number of times by the second light receiving unit.

6. A distance measuring apparatus measuring a distance to a distance measurement object based on a time from projection of an irradiating light onto the distance measurement object until reception of a reflected light from the distance measurement object, the distance measuring apparatus comprising:

a light projecting unit configured to project the irradiating light onto the distance measurement object;

a first light receiving unit configured to receive the reflected light and convert the reflected light into a received light signal based on the reflected light a second light receiving unit disposed adjacent to the light projecting unit, the second light receiving unit being configured to receive the irradiating light and convert the irradiating light into a reference signal based on the irradiating light, the second light receiving unit being different from the first light receiving unit and a distance measuring unit configured to measure the distance to the distance measurement object based on a time from projection of the irradiating light onto the distance measurement object by the light projecting unit until reception of the reflected light by the first light receiving unit, wherein the distance measuring unit calculates an integrated waveform based on a reference waveform of the reference signal and a waveform of the received light signal, determines, based on the integrated waveform, the time from the projection of the irradiating light onto the distance measurement object by the light projecting unit until the reception of the reflected light by the first light receiving unit, and calculates the distance to the distance measurement object based on the determined time, and wherein the distance measuring unit averages a plurality of received light signals to generate a second received light signal, the received light signals being obtained a predetermined number of times, and calculates the integrated waveform based on the second received light signal.

7. The distance measuring apparatus according to claim 6, wherein the distance measuring unit normalizes a maximum value and a minimum value in each of the reference signal and the received light signal to predetermined values and calculates the integrated waveform.

8. The distance measuring apparatus according to claim 6, wherein the light projecting unit projects a light having predetermined intensity before projecting the irradiating light, and wherein the distance measuring unit adjusts intensity of the irradiating light or gain of the first light receiving unit based on intensity of the reflected light.

9. The distance measuring apparatus according to claim 6, further comprising a laser beam scanning unit configured to perform scanning using the irradiating light projected from the light projecting unit.

10. The distance measuring apparatus according to claim 6,
wherein the first light receiving unit includes a plurality of light receiving elements.

11. The distance measuring apparatus according to claim 10,
wherein the plurality of light receiving elements are arranged in a direction corresponding to a scanning direction of the laser beam scanning unit.

12. The distance measuring apparatus according to claim 10,
wherein the plurality of light receiving elements are arranged in a direction different from a scanning direction of the laser beam scanning unit.

13. An electronic device comprising the distance measuring apparatus according to claim 6.

14. A method for measuring a distance to a distance measurement object based on a time from projection of an irradiating light onto the distance measurement object until reception of a reflected light from the distance measurement object, the method comprising:

projecting the irradiating light onto the distance measurement object by a light projecting unit;

receiving the reflected light by a first light receiving unit;

receiving the irradiating light by a second light receiving unit, the second light receiving unit being disposed adjacent to the light projecting unit and being different from the first light receiving unit;

calculating an integrated waveform based on a reference waveform and a waveform of a received light signal, the reference waveform being based on the irradiating light received by the second light receiving unit, the received light signal being based on the reflected light received by the first light receiving unit;

determining, based on the integrated waveform, a time from projection of the irradiating light onto the distance measurement object by the light projecting unit until reception of the reflected light by the first light receiving unit; and calculating the distance to the distance measurement object based on the determined time, wherein the method further includes averaging a plurality of received light signals to generate a second received light signal, the received light signals being obtained a predetermined number of times, and calculating the integrated waveform based on the second received light signal.

15. A non-transitory recording medium storing a computer-readable distance measuring program that, when executed by a computer, causes the computer to perform a process to measure a distance to a distance measurement object based on a time from projection of an irradiating light onto the distance measurement object until reception of a reflected light from the distance measurement object, the process comprising:
  projecting the irradiating light onto the distance measurement object by a light projecting unit;
  receiving the reflected light by a first light receiving unit;
  receiving the irradiating light by a second light receiving unit, the second light receiving unit being disposed adjacent to the light projecting unit and being different from the first light receiving unit;
  calculating an integrated waveform based on a reference waveform and a waveform of a received light signal, the reference waveform being based on the irradiating light received by the second light receiving unit, the received light signal being based on the reflected light received by the first light receiving unit;
  determining, based on the integrated waveform, a time from projection of the irradiating light onto the distance measurement object by the light projecting unit until reception of the reflected light by the first light receiving unit; and
  calculating the distance to the distance measurement object based on the determined time,
  wherein the process further includes averaging a plurality of received light signals to generate a second received light signal, the received light signals being obtained a predetermined number of times, and calculating the integrated waveform based on the second received light signal.

* * * * *